(12) United States Patent
Zhokhavets et al.

(10) Patent No.: US 10,534,073 B2
(45) Date of Patent: Jan. 14, 2020

(54) METHOD FOR THE CHARACTERIZATION OF OBJECTS

(71) Applicant: Phenospex B. V., Heerlen (NL)

(72) Inventors: Uladzimir Zhokhavets, Aachen (DE); Grégoire Martin Hummel, Maastricht (NL); Stefan Schwartz, Wurselen (DE)

(73) Assignee: Phenospex B. V., Heerlen (NL)

( * ) Notice: Subject to any disclaimer, the term of this patent is extended or adjusted under 35 U.S.C. 154(b) by 0 days.

(21) Appl. No.: 15/897,610

(22) Filed: Feb. 15, 2018

(65) Prior Publication Data

US 2018/0246190 A1 Aug. 30, 2018

(30) Foreign Application Priority Data

Feb. 28, 2017 (EP) .................................... 17158433

(51) Int. Cl.
| | | |
|---|---|---|
| *G01B 11/25* | (2006.01) | |
| *G01S 7/48* | (2006.01) | |
| *G01S 7/52* | (2006.01) | |
| *G01S 17/48* | (2006.01) | |
| *G01S 15/08* | (2006.01) | |

(52) U.S. Cl.
CPC ........ *G01S 7/4808* (2013.01); *G01S 7/52017* (2013.01); *G01S 15/08* (2013.01); *G01S 17/48* (2013.01)

(58) Field of Classification Search
CPC .... G01S 7/4808; G01S 7/52017; G01S 17/48; G01S 15/08; G01B 11/02; G01B 11/14; G01B 11/24; G01B 11/245; G01B 11/2518; H04N 13/221; G06T 7/579
USPC .................. 356/601–623; 702/158, 166, 167
See application file for complete search history.

(56) References Cited

U.S. PATENT DOCUMENTS

| | | | | | |
|---|---|---|---|---|---|
| 4,627,734 | A | * | 12/1986 | Rioux ..................... | G01B 11/24 356/3.04 |
| 4,701,047 | A | * | 10/1987 | Eibert .................. | G01B 11/024 356/3.07 |
| 5,024,529 | A | * | 6/1991 | Svetkoff ................ | G01B 11/02 356/3.04 |
| 5,372,030 | A | * | 12/1994 | Prussia .................. | A61B 3/165 209/509 |
| 9,886,749 | B2 | | 2/2018 | Schmitt et al. | |

(Continued)

FOREIGN PATENT DOCUMENTS

DE 102013209109 A1 11/2014

OTHER PUBLICATIONS

Hummel et al. "PlantEye—ein kommerzieller 3D Laser Scanner fur automatisiertes Screening und Phanotypisierung von Pflanzen". Workshop Computer—Bildanalyse in der landwirtschaft und 2. Workshop unbemannte autonom fliegende systeme in der landwirtschaft (81). Jan. 2013. ISSN 0947-7314. pp. 235-240. (includes English-language Summary).

(Continued)

*Primary Examiner* — Hoa Q Pham
(74) *Attorney, Agent, or Firm* — The Webb Law Firm (57) ABSTRACT

A method for characterizing an object using distance measurement includes: determining elevation profiles using distance measurement, and evaluating the determined elevation profiles for a characterization of the object, the characterization includes a position and/or at least one object-specific parameter of the object.

10 Claims, 4 Drawing Sheets

(56) References Cited

U.S. PATENT DOCUMENTS

| | | | | |
|---|---|---|---|---|
| 2006/0158662 A1* | 7/2006 | Schelinski | ............ | G01B 11/24 |
| | | | | 356/602 |
| 2006/0227336 A1* | 10/2006 | Dinner | ................. | G01B 11/25 |
| | | | | 356/601 |
| 2010/0322477 A1* | 12/2010 | Schmitt | ................. | G01S 17/00 |
| | | | | 382/103 |
| 2014/0333938 A1* | 11/2014 | Fischer | ................ | G01B 11/24 |
| | | | | 356/601 |
| 2015/0019164 A1* | 1/2015 | Fujita | .................... | G01B 21/16 |
| | | | | 702/158 |
| 2015/0323648 A1* | 11/2015 | Haglund | ............... | G01C 21/20 |
| | | | | 701/4 |
| 2019/0025049 A1* | 1/2019 | Doge | ................ | G01B 11/2518 |
| 2019/0033068 A1* | 1/2019 | Doge | ................ | G01B 11/2518 |

OTHER PUBLICATIONS

Nurnberg. "Calculating the area and centroid of a polygon in 2d" and "Calculating the volume and centroid of a polyhedron in 3d". 2013. 1 page. www.ma.ic.ac.uk/~m/cetnroid.pdf.

Strothmann, et al. "Plant classification with In-Field-Labeling for crop/weed discrimination using spectral features and 3D surface features from a multi-wavelength laser line profile system". Computers and Electronics in Agriculture (134). Jan. 2017. pp. 79-93.

\* cited by examiner

METHOD FOR THE CHARACTERIZATION OF OBJECTS

CROSS-REFERENCE TO RELATED APPLICATION

This application claims priority to European Patent Application No. 17158433.7 filed Feb. 28, 2017, the disclosure of which is hereby incorporated in its entirety by reference.

BACKGROUND OF THE INVENTION

Non-limiting embodiments or aspects of the present invention relate to a method for characterizing an object using distance measurement.

In some distance measurement methods, an object is illuminated in a line-shaped manner using ultrasound or light. Here, ultrasound and light are generated by a source. In some laser triangulation methods, this is a line laser. Due to the topography of the object, the line is distorted. A camera captures the line distortion and uses the same to determine an elevation profile along the illuminated line. Here, the camera and the source are typically combined to a sensor. For capturing the entire surface of an object, either the sensor is moved relative to the object or the object is moved e.g. by a conveyor belt. Thus, the height of the object can be detected.

Most objects of daily life have a closed, substantially convex surface which can be detected well by distance measurement. However, reliable detection is difficult with similar, but not exactly identical objects, where e.g. each object has an individual shape, as is the case with plants, harvest products or animals. Cars also are similar in shape, yet not exactly identical.

For checking quality, sorting or subsequent processing, such as during harvesting, the surface shapes are not the only aspect of interest. Rather, a further characterization of the object is required. This is particularly true, if the objects to be detected are similar, but not exactly identical, so that e.g. a reliable characterization of plants or harvest products, animals, cars or the like is desirable in order to guarantee an individual and optimal treatment or processing of the object.

Therefore, it is an object of the present invention to provide a method for characterizing an object by means of distance measurement.

SUMMARY OF THE INVENTION

In a method for characterizing an object by means of distance measurement, elevation profiles are determined in particular in a line-wise manner by distance measurement. In this regard, the distance measurement may e.g. be a known method for distance measurement. The determined elevation profiles are subsequently evaluated for characterizing the object. The characterization of the object includes the position and/or at least one object-specific parameter of the object. The position of the object e.g. allows for a sorting or subsequent treatment, in particular for a harvesting. The object-specific parameter allows the object to be assessed, e.g. by a condition assessment regarding the growth, ripeness, appearance and/or the like, wherein the assessment is a quantified assessment. In addition, the object-specific parameter e.g. allows to provide a treatment and/or sorting dependent on the parameter. Therefore, for a subsequent quality check, the characterization of the object may not be based only on the elevation information about the object, but it is possible to take into account the position and/or at least one object-specific parameter for that purpose.

Preferably, each elevation profile includes 500 to 1000 data points so that for each line-shaped elevation profile preferably 500 to 5000 elevation information items are obtained along the elevation profile.

The distance between the line-wise elevation profiles is preferably 0.2 mm to 2 cm, particularly preferred 0.5 to 2 mm. The distance between the line-wise elevation profiles depends on the respective application and the size of the object to be detected. Accordingly, the distance between the line-wise elevation profiles is chosen to be small for small objects and to be large for large objects.

Preferably, the distance between the line-wise elevation profiles is constant.

In a further embodiment of the method, surface elements are determined from the determined elevation information to determine the position of an object. These surface elements are primitive surfaces such as e.g. triangles or squares. Here, the sides of the surface elements each connect data points of the elevation profiles.

This method is also known as tessellation, wherein, when triangles are used, exactly two triangles are determined from two data points of a first elevation profile and two data points of a second elevation profile. Thereafter, a normal vector is determined for each of these surfaces, starting from the surface element. Therefore, the number of surface elements and normal vectors is identical. Specifically, the normal vector defines a direction, as well as an origin starting from the surface element. The normal vector has no predetermined length. Thus, the normal vector may alternatively also be conceived as a straight line intersecting with the surface element and extending in a direction perpendicular to the surface element. As an alternative, the normal vector may be conceived mathematically as a half-line starting from the surface element in a direction perpendicular to the surface element. In both cases, the length of the straight line and the half-line is not defined and in particular not limited. Here, the direction of the normal vectors may be defined such that, with concave objects, it is oriented towards the distance measuring device and that, with convex objects, it is directed away from the distance measuring device. The point of intersection of the normal vectors is determined as the position of the object. As an alternative, the point of the highest intersection density is determined as the position of the object, in particular if not only a single point of intersection exists, which is true only in the special case that the object is a sphere. As an alternative, the position mean value or the center of gravity of all points of intersection of the normal vectors is determined as the position of the object. For this purpose, the points of intersection of the normal vectors may first be projected on a plane and the position of the object on this plane may be determined from the point of intersection or the point with the highest intersection density or from the mean value or the center of gravity of all points of intersection. The plane is in particular a plane that is parallel to the plane in which the objects are arranged, preferably a horizontal plane. Thus, the position of the object is reliably determined. In particular, for objects that are similar in shape, yet not exactly identical, such as e.g. plants or harvest products, it is possible to exactly determine the position individually for each single object in a simple manner from the detected elevation profiles.

Preferably, a low pass or smoothing operation is performed on the determined points of intersection prior to the determination of the position of the object. This is effected in particular by means of a Fourier low pass, in which the high frequencies are clipped in the frequency domain. Thereby, the method for determining the position of an object becomes more robust, since statistic outliers are no longer taken into account.

Preferably, a region B having an area A is determined, within which the object is essentially located. Here, the region B may be determined empirically or it may be calculated, e.g. by the distance between two objects. The region B may be predefined or determined individually for an object or it may be chosen or determined in an identical manner for a plurality of objects. Thereafter, the maximum length of the normal vectors is limited to a region B' with the area $C_1^2 \cdot A$, where the region B' is arranged symmetrically around the respective origin of the normal vector. Here, $C_1$ is in particular chosen to be greater than 1. $C_1$ may be predefined by the user, e.g. empirically predetermined, or it may be adjusted in the course of the process so that an optimum result is obtained. Due to the limitation of the maximum length, the calculation process for the points of intersection of the respective normal vectors is reduced. Thereby, the computing effort for the determination of the position of an object is maintained low and the execution of the process is accelerated.

Preferably, the region B is a circle with a radius R, with the object being essentially located within the circle.

Preferably, a region B having an area A is determined, within which the object is essentially located. The region B may be the same region as described above. The minimum length of the normal vectors is then limited to a region B" having the area $C_2^2 \cdot A$, where the region B" is arranged symmetrically around the origin of the respective normal vector. Here, $C_2$ is in particular chosen to be less than 1. A limitation of the minimum length of the normal vectors takes into account that, immediately originating from the surface element, no point of intersection with another normal vector must be assumed. Thereby, the computing effort for the determination of the position of an object is reduced and the execution of the process is accelerated. For this purpose, $C_2$ may be empirically predetermined, or it may be determined from the current process and be adjusted.

Preferably, the region B is a circle with a radius R, with the object being essentially located within the circle.

The length of the normal vectors is preferably modified as a function of the distance from the center of the object and/or as a function of an angle $\alpha$ between the perpendicular and the respective normal vector. In this regard, it is assumed that in the ideal case, given a substantially convex object, the angle of the normal vector with respect to the perpendicular increases starting from the center of the object. In particular, a longer normal vector is taken into account for normal vectors originating from a surface element that is farther away from the center of the object, and a shorter normal vector is taken into account for normal vectors originating from a surface element that is very close to the center of the object, for which the angle $\alpha$ is small. The relation between the considered length of the normal vectors and the angle $\alpha$ can be described by a predefined function or can be determined empirically. By modifying the considered length of the normal vectors it is ensured that the required points of intersection with other normal vectors can be calculated in a reliable manner, while, however, avoiding a computationally intensive further consideration of the normal vectors.

In another embodiment of the invention, a region B is determined for determining an object-specific parameter, with the object being essentially located in that region. This region may in particular be the region B described above. Thereafter, a histogram is generated for all data points of the elevation profiles located in the region B. The histogram is divided into a lower section, an intermediate section and an upper section. A weighted mean value is calculated for the intermediate section of the histogram. A median of the histogram divided by the weighted mean value is assumed as a relative center of density. Depending on the respective application, this is e.g. the center of mass of the object. For this purpose, the lower section, the intermediate section and the upper section are chosen corresponding to the object to be detected. The lower section covers e.g. 50% to 90% of the data points of the histogram, starting from the smallest elevation values. The upper section covers in particular 2% to 30% of the data points, starting from the largest values of the elevation profiles. The intermediate section is limited at the bottom by the lower section and is limited at the top by the upper section.

In another embodiment of the method the object is a harvesting product and in particular a lettuce or cabbage. In this respect, lettuce or cabbage include: head lettuce, iceberg lettuce, read oak leaf lettuce, chicory, Lollo Rosso, Lollo Bianco, Radiccio, endive and the like, as well as white cabbage, pointed cabbage, Chinese cabbage, red cabbage, cauliflower, Romanesco, broccoli and other cabbages of the *Brassica* species.

In another embodiment of the method for determining an object-specific parameter, a region B is determined within which the harvest product, and in particular the lettuce or cabbage, is substantially located. The region B may in particular be the region described above. Then, the number of data points within this region is determined as $N_{total}$. In addition, the area A of the region B is determined. Thereafter, a radius R' is defined and number of data points within the radius R' is calculated as $N_{core}$. The ratio of $(A \cdot N_{core})/(R'^2 \pi \cdot N_{total})$ is used as an opening parameter. Thus, an object-specific parameter is determined for the harvest product, especially the lettuce or cabbage, which parameter allows for a conclusion on the quality of the harvest product and/or for a statement about the ripeness and/or condition of the harvest product. Using the opening parameter, it is also possible to make a statement about a subsequent processing, e.g. for harvesting purposes, e.g. regarding an automatic gripping, so as to determine e.g. the necessary opening of the automatic gripper. The reason for this is that especially with lettuce and cabbage, vertical outer leaves exist for which no or only an insufficient number of data points can be determined, since they are parallel to the distance measuring device in the sense that these leaves extend parallel to the incident illumination of the distance measurement. Further, lettuce and cabbage most often have inner leaves that have grown together to a ball shape and thus form a central, spherical surface that is perpendicular to the distance measuring device in the sense that the central spherical surface is substantially perpendicular to the incident illumination of the distance measurement. Thereby, a plurality of data points can be determined in a simple manner in the central spherical region of the harvest product. Due to the above ratio, it can now be determined, whether mainly widely opened, perpendicular leaves or mainly cabbage or lettuce closed in themselves exist.

The region may preferably be a circle with a radius R, where: $R'=C \cdot R$ with $0 \leq C \leq 1$ and the opening parameter is obtained from $N_{core}/(C^2 \cdot N\,total)$.

The opening parameter thus calculated is preferably compared to a threshold value S. If the opening parameter is lower or equal to the threshold value S, the lettuce or cabbage is referred to as being open. If the opening parameter is above the threshold value S, the lettuce or cabbage is referred to as being closed. Preferably, a value of 1 is assumed for the threshold value, but it may be varied for different harvest products. Here, the threshold value S may in particular be determined empirically or may be predetermined. In particular, the threshold value is adjusted during the process. This step allows for a categorization of the harvest product, whereby the subsequent processing can be optimally adapted to the respective harvest product. Specifically, the opening parameter can be taken into account during automated harvesting.

In another embodiment of the method, the distance measurement is performed using ultrasound or laser triangulation.

In another embodiment of the method, the elevation profiles determined are evaluated in real time or at least essentially in real time for a characterization of an object. Thus, the characterization of the object is immediately available so that the object can be assessed, sorted and/or processed further based on the characterization, without the characterization causing a delay in the process.

In another embodiment of the method, a characterization is performed as soon as a further line-wise elevation profile has been determined. Thus, it is not necessary to wait until all elevation profiles for an object are detected by the distance measurement so that the computational effort can be distributed over the duration of the entire distance measurement, i.e. all line-wise elevation profiles. In another embodiment distance measurement is performed using a sensor, wherein in particular a source and a camera are arranged within the sensor. Here, the object is moved relative to the sensor by moving the object and/or by moving the sensor. Thus, due to the relative movement of the object to the sensor, it is possible to successively determine one line-wise profile after the other, so as to capture the entire object. With a uniform movement, it is possible e.g. to select a time interval for the respective detection of a new elevation profile. The uniform movement ensures that distance between the elevation profiles is substantially constant. As an alternative, the distance traveled may be detected and a new line-wise elevation profile can be generated at a predetermined distance from the last elevation profile. As an alternative, the generation of a new elevation profile may be initiated by a trigger input to the sensor caused by a predetermined event such as e.g. the advance of a conveyor belt or the like. Thereby, it is ensured that a sufficient number of line-wise elevation profiles are determined and that the distance between them is uniform or constant.

In a further embodiment, the above described method is executed cyclically, wherein each cycle corresponds in particular to the detection of an object. Thereby, a great number of objects can be characterized one after the other and an individual treatment or processing of the objects can be effected.

The invention will be described in more detail hereinafter with reference to preferred embodiments and to the accompanying drawings.

DETAILED DESCRIPTION OF THE INVENTION

Figure 1:
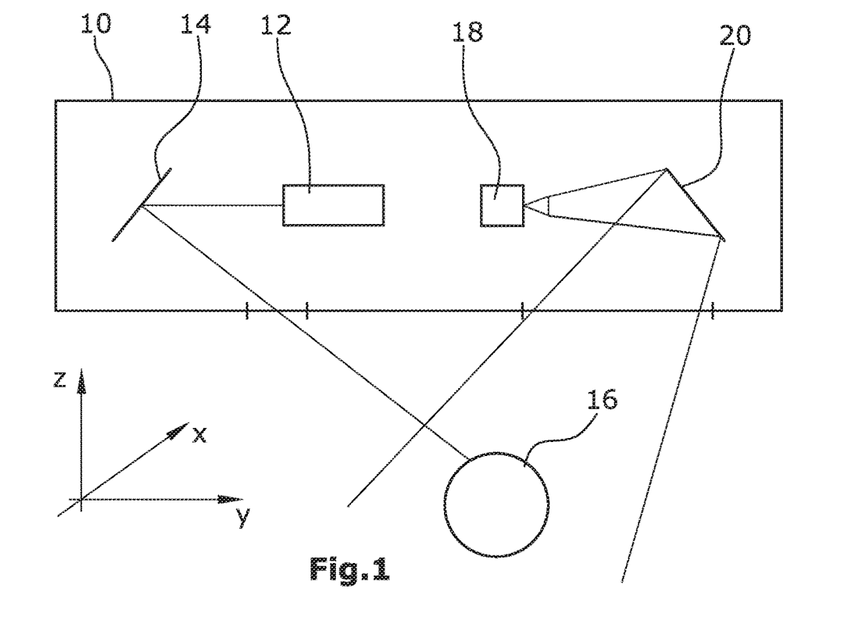
FIG. 1 shows a schematic set-up for distance measurement.
Figure 2:
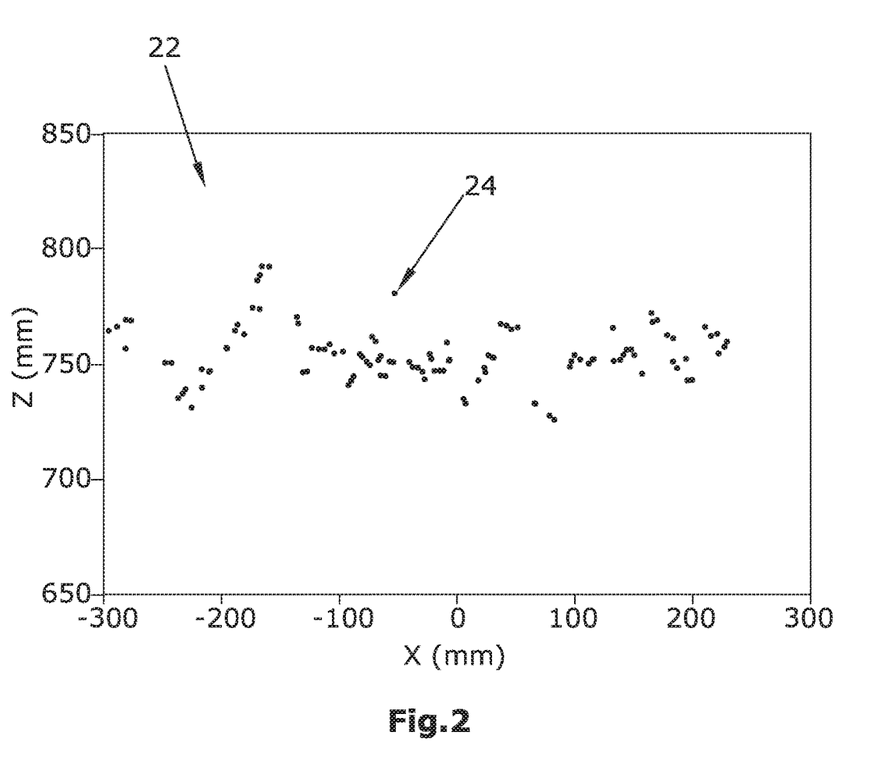
FIG. 2 shows a line-wise elevation profile determined by distance measurement.

In a method for characterizing an object by means of distance measurement, line-wise elevation profiles are first determined by means of distance measurement and then evaluated in a suitable manner for the characterization of the object, wherein the characterization of the object includes the position and/or at least one object-specific parameter of the object. In this context, a laser triangulation system as illustrated in FIG. 1 can be used for distance measurement. The system comprises a sensor 10 in which a line laser 12 is arranged which illuminates an object 16 via a mirror 14. Via a further mirror 20, the line generated by the laser 12 on the object 16 is imaged by a camera 18 which is also arranged in the sensor 10. The line on the object 16 is distorted by the topology of the object 16. Based on this distortion, an evaluation means which is connected to the camera, can determine an elevation profile along the line generated by the laser 12. Thereby, according to the coordinate system in FIG. 1, the Z-component of the object 16 is determined. Such an elevation profile 22 is illustrated e.g. in FIG. 2 and is composed of a great number of data points 24 per line, in particular 500 to 5000 data points per elevation profile. Thereafter, for the complete detection of the object 16, either the object and/or the sensor 10 is displaced along the Y-axis, and another line-wise elevation profile is determined as described before. Thereby, a large number of elevation profiles is determined. These typically have a mutual distance of 0.5 mm to 2 cm, where the distance is in particular constant and is predetermined e.g. by a continuous movement of the sensor 10 or the object 16 relative to each other until a time has lapsed, or after a relative movement of the sensor 10 by a predetermined distance with respect to the object 16.

Figure 3:
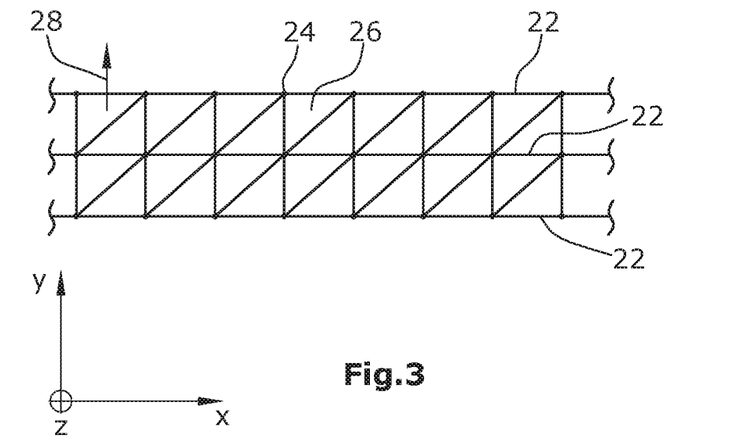
FIG. 3 shows a detail of three elevation profiles with the surface elements determined.

FIG. 3 illustrates a detail showing a part of three elevation profiles 22. Here, the points 24 indicate the data points of the respective elevation profile. For the determination of the position of an object, surface elements 26 are determined from the elevation profiles 22. In FIG. 3, these are triangles. However, other surface elements are also conceivable. The corners of the surface elements 26 are located on the data points 24 of the elevation profiles 22 and are connected by the sides of the surface elements. This process is also known as tessellation.

Figure 4:
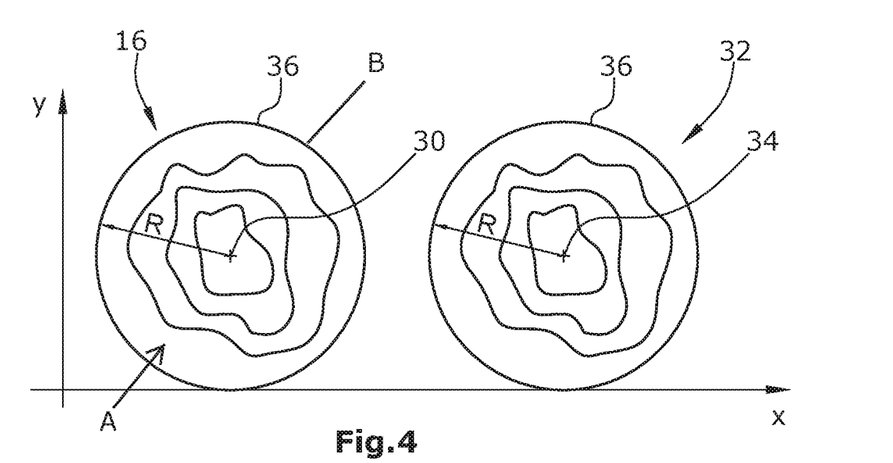
FIG. 4 shows a heat map for indicating of the intersection density of normal vectors of the surface elements, FIG. 5A an exemplary surface element with a normal vector.

For each of the surface elements 26 a normal vector 28 is then calculated which stands perpendicularly on the surface element 26. For reasons of clarity, FIG. 3 only shows one of these normal vectors 28. Thereafter, all points of intersection of these normal vectors 28 are determined. FIG. 4 illustrates a representation in the form of a heat map as an example, wherein the position of the points of intersection has been projected onto the x/y-plane and the density of the points of intersection is shown in the heat map of FIG. 4. Here, the projection is made into the plane parallel to the plane in which the objects are arranged. The site with the highest intersection density 30 is assumed to be the position of the object 16. FIG. 4 illustrates another object 32 which comprises another site of the highest intersection density 34. Thereby, the position of the two objects 16 and 32 is known. This is true in particular irrespective of the shape of the object as long as the same has a substantially concave or convex surface, wherein, in case of a concave surface, the normal vectors are defined such that they are directed towards the sensor 10. Whereas, in case of a convex or substantially convex shape of the object 16, 32, the normal vectors are defined such that they are directed away from the sensor 10, i.e. in the negative Z-direction.

Thus, a robust method is obtained for determining the position of an object, in particular for similar, but not exactly identical objects, e.g. plants, animals, cars and the like.

Figure 5A:
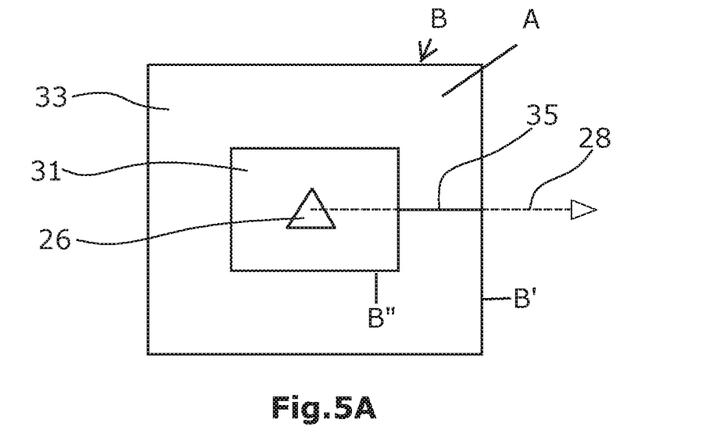

For a reduction of the computational effort for the determination of the points of intersection of the normal vectors, a radius R is determined within which the object 16, 32 is essentially located. For the purpose of illustration, the radius R is drawn for the object 16 in FIG. 4, represent by the circle 36. The maximum length of the respective normal vectors 28 can now be limited to $C_1 \cdot R$, where $C_1$ is chosen to be larger than 1. As an alternative or in addition, the minimum length of the normal vectors 28 can be limited to $C_2 \cdot R$, where $C_2$ is chosen to be smaller than 1. In this manner, both remote points of intersection and points of intersection immediately adjacent the surface element are not considered in the determination of the position of the object. This is also illustrated in FIG. 5A which illustrates a single surface element 26 as an example. A normal vector 28 originates from this surface element 26. A first region 31 is arranged around the surface element 26 or the origin of the normal vector 28, which region defines the minimum length of the relevant normal vector 28. A second region 33 is defined around the surface element 26 or the origin of the normal vector 28, which region indicates the maximum length of the relevant normal vector 28. Thus, only the region 35 of the normal vector 28 that is located between the regions 31 and 33 is taken into account. This is done for each of the normal vectors 28 determined. In this manner, only that section of the respective normal vectors 28 is considered in which an intersection with another normal vector 28 can be expected. This allows for a significant reduction of computational effort, so that the method can be executed faster, in particular in real time.

Figure 5B:
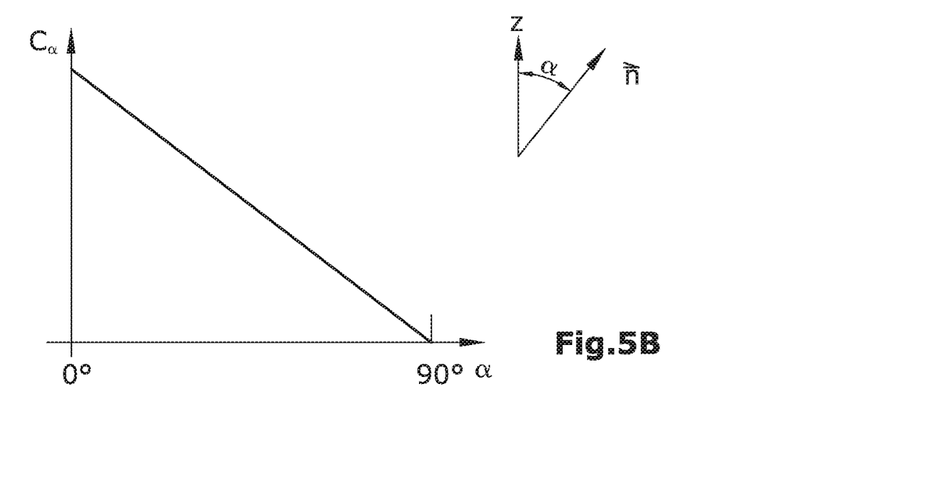
FIG. 5B shows a functional relationship between the modification of the length of the normal vectors and the angle between the perpendicular and the normal vector.

Further, a modification of the length of the normal vector can be considered based on the angle a between the normal vector $\bar{\eta}$ and the vertical z-direction. Here, the modification of the length of the normal vectors to be considered can be effected based on an empirical dependence on α or, as illustrated in FIG. 5B, based on a functional relationship, wherein the modification is effected via a parameter $C_a$ plotted over the angle α.

Thereby, the computational effort for the determination of the points of intersection of the normal vectors can be maintained low and in particular it is possibly to guarantee a determination of the position of an object in real time.

Figure 6:
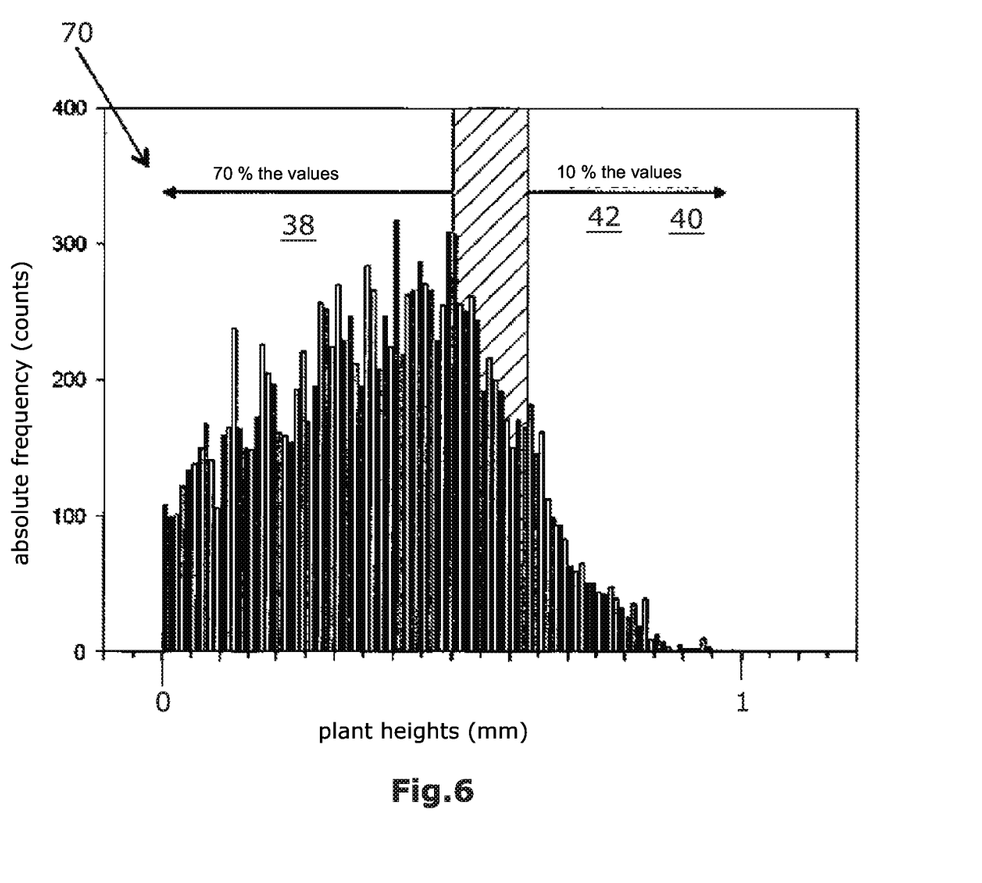
FIG. 6 shows a histogram of the determined data points of the distance measurement.

For the determination of a relative density center of the object as an object-specific parameter, the data points within a region are plotted as a histogram, as illustrated in FIG. 6. Thereafter, the histogram is divided into a lower section 38, an upper section 40 and an intermediate section 42 situated therebetween. Here, for example, starting from the smallest elevation values or z-values, 70% of the data points are located in the lower section 38 and 10% of the data points are located in the upper section 40, starting from the greatest elevation values or z-values. Thus, in the example illustrated, the intermediate section 42 inbetween comprises 20% of the data points. Other distributions are also possible, where, for example, the lower section 38 can comprise in particular 50% to 90% of the data points and the upper section 40 can comprise 2% to 30%. A weighted mean value is calculated for the values of the intermediate section 42. In addition, a median of the histogram is determined and the median is divided by the weighted mean value of the intermediate section 42. The result is assumed as the relative center of density which corresponds to the relative center of gravity of the object. Here, depending on the kind of object characterized by the method, the region of the lower section 38 and of the upper section 40 can be adjusted such that the relative center of density thus determined coincides with the actual center of density.

The method for determining an opening parameter will be described hereunder using an object in the form of lettuce as illustrated in FIGS. 7A to 8B.

Figure 7A:
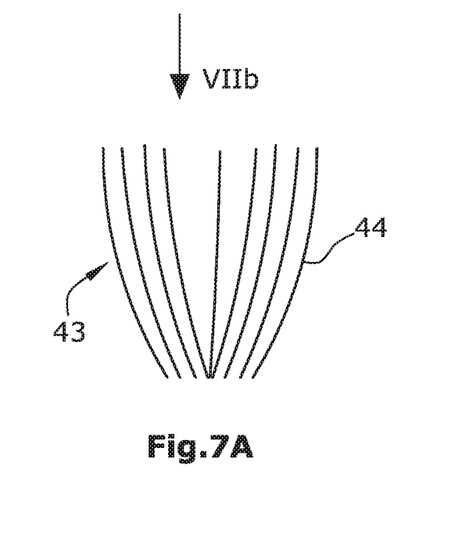
FIG. 7A is a side view of a harvest product in the form of lettuce in an open state.
Figure 7B:
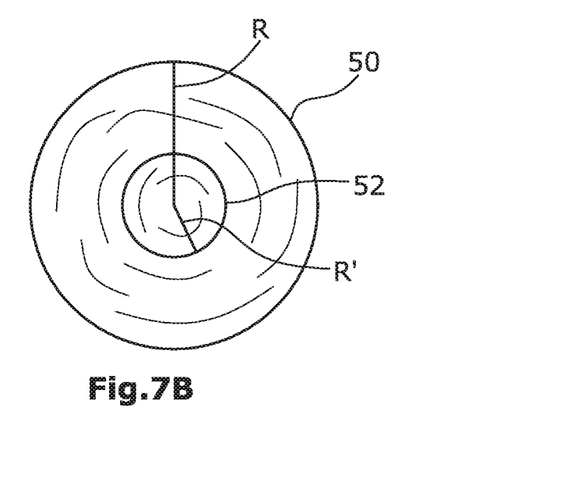
FIG. 7B shows the harvest product of FIG. 7A in top plan view.
Figure 8A:
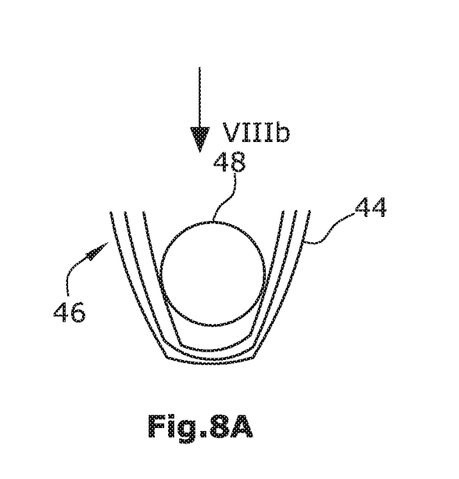
FIG. 8A is a side view a harvest product in the form of lettuce in a closed state.
Figure 8B:
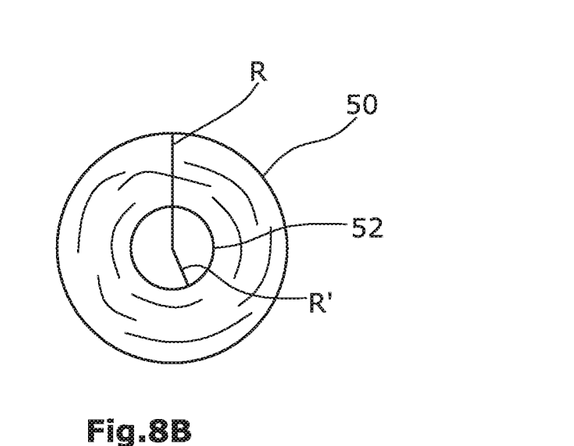
FIG. 8B shows the harvest product in top plan view.

FIG. 7A is a side view of a lettuce in an open state. Most leaves 44 of the lettuce grow in a substantially vertical direction or z-direction. A top plan view of the lettuce 43 is illustrated in FIG. 7B. FIG. 8A schematically illustrates a lettuce 46 in a closed state in which the leaves have grown together in the center of the lettuce 46 and thereby form an in particular spherical surface 48. A circle 50 is defined with a radius R within which the harvest product and in particular the lettuce 43, 46 is located. Thereafter, the number of data points present within the circle 50 is determined as $N_{total}$. Next, a second circle 52 is defined with a radius R' around the same center as the circle 50. In this regard, the radii R and R' and the ratio between the radii R and R' can be chosen freely and can be adapted to the respective harvest products, depending on the application. In particular, the radii in FIG. 7A and FIG. 7B can be chosen to be different.

Thereafter, the number of data points within the circle 52 is determined as $N_{core}$. The ratio of $N_{core}$ to $N_{total}$ relative to the surface of the respective circle 50, 52 is calculated as the opening parameter. Thus, the opening parameter is defined as the ratio between the data point densities within the circles 50 and 52. In other words: if the ratio between the radii R' and R is indicated by C, where $0 \leq C \leq 1$, the opening parameter is obtained as $N_{core}/(C^2 \cdot N_{total})$.

Since the leaves of the lettuce 43 are essentially parallel to the sensor 10, no or only a small number of data points can be determined for the same. On the other hand, a large number of data points can reliably be determined in the spherical core region of the lettuce 46, just because the spherical surface 48 of the lettuce 46 is oriented perpendicularly to the sensor and can thus be easily detected by the same. In this manner, an object-specific parameter can easily be obtained which indicates the state of the harvest product and thus allows for a reliable performance of a subsequent treatment or harvest. Here, the individual shape of the specific harvest product or of a single lettuce or cabbage can be taken into account.

The invention claimed is:

1. A method for characterizing an object using distance measurement, the method comprising:
    a) determining elevation profiles based on a distance measurement,
    b) evaluating the determined elevation profiles for a characterization of the object, and
    c) determining the position of the object, wherein the characterization comprises at least one of a position and at least one object-specific parameter of the object, wherein surface elements are determined based on the determined elevation profiles, wherein normal vectors are determined for each of the surface elements, wherein the normal vectors originate from the respective surface element, wherein a point of intersection, a point having a highest intersection density, or a mean value of all points of intersection of the normal vectors is determined as the position of the object, wherein a region B with an area A is determined, within which the object is located, and wherein a maximum length of the normal vectors is limited to a region B' with an area $C_1^2 \cdot A$ which is arranged symmetrically with respect to the origin of the normal vector, where $C_1$ is greater than 1.

2. The method of claim 1, wherein the region B with the area A is determined, within which the object is located, and wherein a minimum length of the normal vectors is limited to a region B" with a surface $C_2^2 \cdot A$ which is arranged symmetrically with respect to the origin of the normal vector, where $C_2$ is smaller than 1.

3. The method of claim 1, wherein a length of the normal vectors is modified based on at least one of a distance from a center of the object and an angle α between the perpendicular and the respective normal vector.

4. The method of claim 1, wherein the object comprises a harvest product.

5. The method of claim 1, wherein the distance measurement is effected using ultrasound or laser triangulation.

6. The method of claim 1, wherein the evaluation of the determined elevation profiles for the characterization of the object is performed in real time.

7. The method of claim 1, wherein the distance measurement is performed using a sensor, and the object is moved relative to the sensor by moving the object and/or by moving the sensor.

8. The method of claim 1, wherein a continuous evaluation is performed after each newly detected elevation profile.

9. A method for characterizing an object using distance measurement, the method comprising:

a) determining elevation profiles based on a distance measurement, b) evaluating the determined elevation profiles for a characterization of the object, and c) determining the object-specific parameter of the object, wherein the characterization comprises at least one of a position and at least one object-specific parameter of the object, wherein a region B with an area A is determined, within which the object is located, wherein a histogram is generated for all data points of the elevation profiles located within the region B, wherein the histogram is divided into a lower section, an intermediate section and an upper section, wherein a weighted mean value is determined for the intermediate section of the histogram, and wherein a median of the histogram divided by the weighted mean value is determined as a relative density value.

10. A method for characterizing an object using distance measurement, the method comprising:

a) determining elevation profiles based on a distance measurement, b) evaluating the determined elevation profiles for a characterization of the object, and c) determining an object-specific parameter, wherein the characterization comprises at least one of a position and at least one object-specific parameter of the object, wherein a region B with an area A is determined, within which a harvest product is located, wherein a number of the data points within the region B is determined as Ntotai, wherein the area A of the region B is determined, wherein a radius R' is defined, wherein a number of the data points within the radius R' is determined as $N_{core}$, and wherein a ratio of $(A \cdot N_{core})/(R'^2 \cdot \pi \cdot N_{total})$ is determined as an opening parameter.

* * * * *

UNITED STATES PATENT AND TRADEMARK OFFICE
CERTIFICATE OF CORRECTION

PATENT NO. : 10,534,073 B2
APPLICATION NO. : 15/897610
DATED : January 14, 2020
INVENTOR(S) : Uladzimir Zhokhavets et al.

Page 1 of 1

It is certified that error appears in the above-identified patent and that said Letters Patent is hereby corrected as shown below:

In the Claims

Column 10, Line 36, Claim 10, delete "Ntotai," and insert -- $N_{total,}$ --

Signed and Sealed this
Fifth Day of May, 2020

Andrei Iancu
*Director of the United States Patent and Trademark Office*